Nov. 11, 1930.   L. GANDRIAUT   1,781,575
WEIGHING APPARATUS
Filed May 15, 1928   2 Sheets-Sheet 1
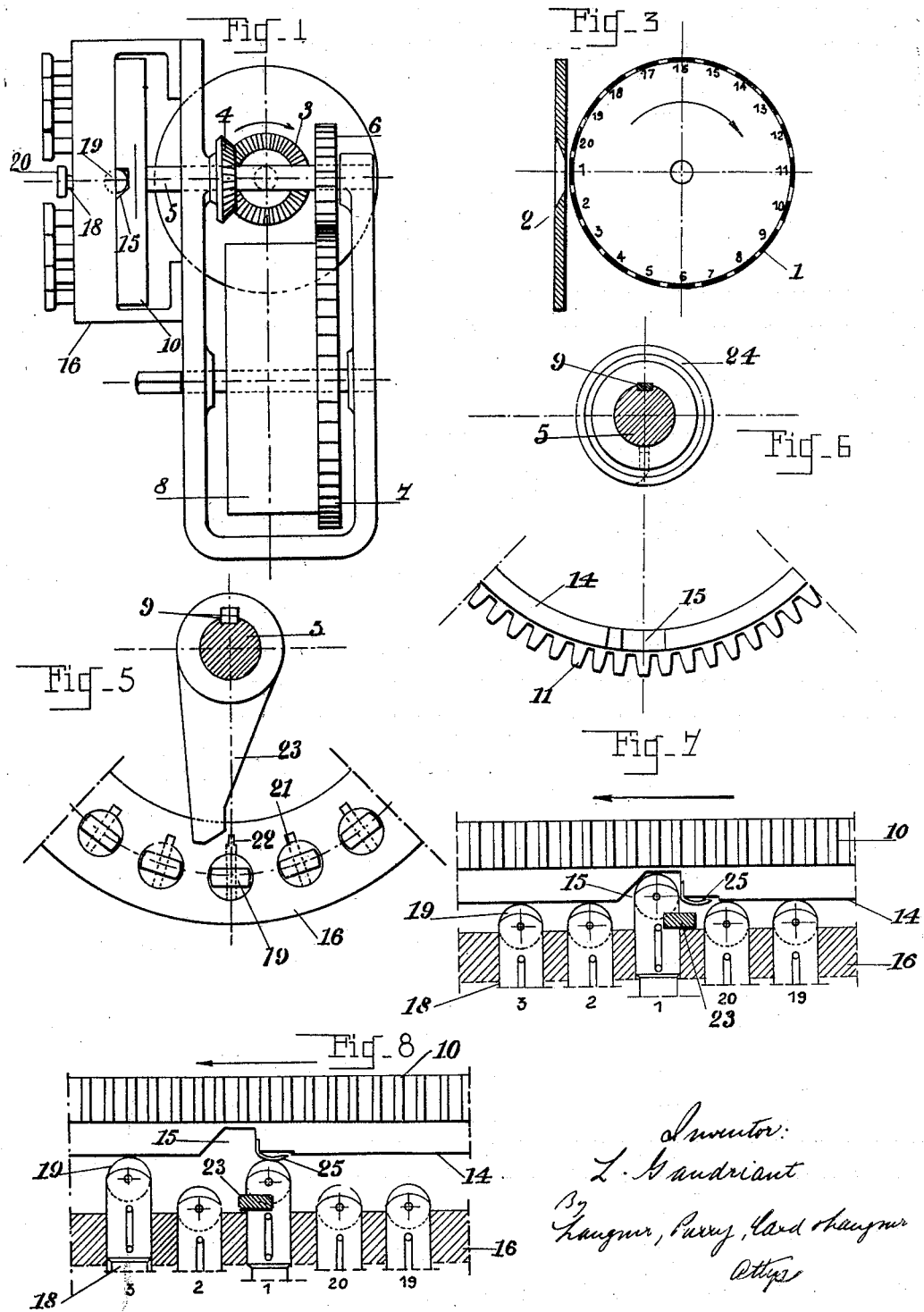

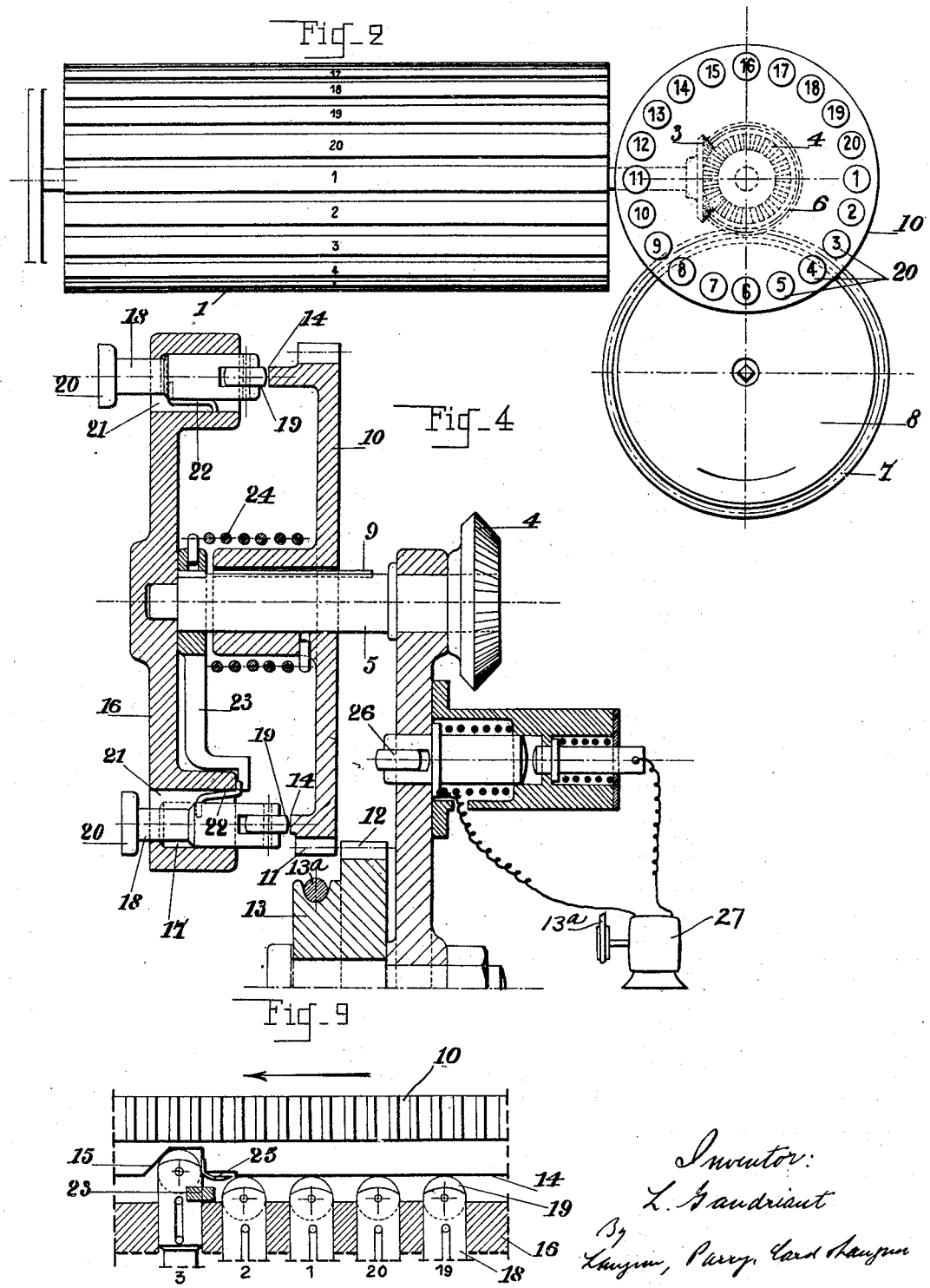

Patented Nov. 11, 1930

1,781,575

UNITED STATES PATENT OFFICE

LUCIEN GANDRIAUT, OF NANCY, FRANCE

WEIGHING APPARATUS

Application filed May 15, 1928, Serial No. 277,856, and in France May 31, 1927.

In certain weighing apparatus, particularly in automatic scales with direct reading of the price of the merchandise weighed, a fixed number of graduated scales are disposed on the periphery of a cylinder or other member until this scale appears in a window provided for this purpose.

The present invention has for its object a weighing apparatus in which a selector automatically brings the desired scale to the desired position.

The invention also has for its object an arrangement of automatic selector in which the depression of a button effects on one hand the starting of the motor member and on the other hand the locking of this member after a displacement of the scale carrying member corresponding to the number of scales disposed between the scale initially in position and the scale desired.

In particular the scale carrying member is entrained by a motor member provided with a locking device which comprises a fixed crown provided with buttons and a moving plate entrained during the period of use by the motor device, the crown and the plate being disposed in such a manner that the depression of a button releases the plate until the moment when the end of the depressed key enters a notch in the moving plate which is thus again locked and thus stops the motor member and fixed the scale carrying member in the desired position.

By way of example two embodiments of the invention are shown in the accompanying drawing.

Figures 1 and 2 are elevations of the complete selector with mechanical drive.

Figure 3 is a section of the cylinder with the graduated scales.

Figure 4 is a section of the complete selector with electric drive.

Figure 5 is a partial view of the fixed crown of this selector.

Figure 6 is a partial view of the moving plate.

Figures 7, 8 and 9 are developed views of various respective portions of the fixed crown and the moving plate.

In the example illustrated in Figures 1, 2 and 3, a drum 1 carries graduated scales numbered from 1 to 20.

Visibility is limited to one scale by the sight opening or window 2.

The drum 1 carries on its spindle a bevel pinion 3 driven by a second pinion 4 which is keyed on the spindle 5 of a pinion 6 driven by a wheel 7 and a spring barrel 8. The spindle 5 carries a feather 9 which prevents rotation of a plate 10 on the spindle but permits it to slide (Figure 4). The plate 10 comprises a track 14 in which is formed a notch 15 of suitable form. A fixed crown 16 secured to the frame-work carrying the spindle 5 serves as a bearing for this spindle and comprises recesses 17 each corresponding to one of the graduated scales on the drum 1. In each of these recesses 17 slides a tappet 18 which carries a roller 19 running on the track 14. On the other end of each tappet is mounted a button 20, fixed or removable, carrying a mark corresponding to that of one of the graduated scales. These marks are placed in the same order as those of the scale and in the proper direction. Each recess comprises a groove 21 which serves to guide a spring 22 itself fixed on each tappet 18. On the spindle 5 is keyed a finger 23 located substantially opposite and slightly behind the notch 15. The plate 10 is constantly urged towards the hub of the finger 23 by a tension spring 24. On the track 14 following the notch 15 is fixed a small spring 25 projecting above the track, It should be mentioned that this mechanical drive can be replaced by an electric drive as is shown in Figure 4.

In that case the device described above is modified as follows; the rim of the plate 10 has teeth 11 designed to mesh with corresponding teeth 12 on a pulley 13 which is driven by an electric motor 27, and a spring pressed switch closes the circuit of the motor driving the pulley 13 by belt 13ᵃ when the plate 10 comes into contact with the press button 26 of this switch.

The devices thus described operate in the following manner.

The scale No. 1 for example being supposed in place behind the window 2 as a result of the previous depression of the tappet corresponding to scale No. 1, the plate 10 and the crown 16 occupy the relative position shown in Figure 7. The roller of the tappet corresponding to scale No. 1 is therefore engaged in the notch 15, thus preventing the plate 10 from turning.

If it is desired to bring into view another graduated scale say No. 3, it suffices to press in to its full amount the tappet corresponding to the scale. This has for its effect first to release the spring 22 of this tappet which is locked on the rim of the crown 16 and prevents the tappet from moving back. The roller 19 corresponding to this tappet pushes the plate 10 to the right in spite of the action of the spring 24. The roller of the tappet corresponding to scale No. 1 is consequently released from the notch 15 of the plate 10 which can thus turn under the action of the spring motor 6, 7, 8.

In the case of the electric drive, the teeth 11 and 12, are meshed by the displacement of the plate 10 which at the same time has started the motor by the switch 26.

As soon as the plate 10 starts turning the finger 23 lifts the spring 22 of the tappet corresponding to the scale No. 1, permitting the spring 25 to return the tappet into its recess until the spring enters its groove, as is shown in Figure 8. The plate continues to rotate until the notch 15 arrives opposite the tappet No. 3. At this moment under the action of the tension spring 24 the notch 15 engages over the roller of the tappet No. 3 which stops it and the plate 10 takes the position of Figure 9 after having returned the tappet corresponding with the scale No. 1 which is no longer held out by its spring 22.

Since the plate 10 by the agency of the gears 3 and 4 or any device deemed preferable carries with it in its movement the drum 1 or the member replacing it, the scale No. 1 will be replaced behind the window 2 by the scale No. 3.

If it is desired again to bring another scale into view, for example No. 20, the depression of tappet No. 20, distant from the tappet No. 3, in the direction of rotation by seventeen intervals, will produce a rotation of the plate 10 and of the drum 1, also corresponding to seventeen intervals of scales on the drum, which will bring scale No. 20 behind the window 2, and so forth.

The present invention can be applied to any weighing apparatus comprising a given number of graduated or ungraduated elements of which it is desired to bring one automatically into a determined position, by the simple actuation of moving member corresponding to the element to be selected.

Having now particularly described and ascertained the nature of my said invention and in what manner the same is to be performed, I declare that what I claim is:

1. In a weighing apparatus of the type described comprising a casing having a sight opening, a rotatable carrier having a plurality of scales thereon each of which is adapted to be brought individually to a position opposite said sight opening, an annular member rotatable upon its axis and longitudinally movable thereon, said member being connected for rotation with said carrier, said member having a recess therein, tappets located opposite said annular member for moving said member longitudinally, spring means urging said annular member towards said tappets and driving means for rotating said annular member operative when said member has been moved longitudinally by operating one of said tappets against said spring means thereby rotating said carrier, said driving means being stopped when said operated tappet encounters said recess allowing a return longitudinal movement of said member.

2. In weighing apparatus of the class described, a rotatable support carrying a plurality of scales, a rotatable plate connected with said support so as to rotate therewith, a motor for rotating said plate, said rotatable plate being mounted so as to be movable along its axis, a series of tappets slidably mounted in proximity to said plate to move said plate along its axis, spring means normally urging said plate towards said tappets, a circuit including said motor, means actuated by the movement of said plate for closing and opening said circuit to thereby actuate and stop said motor and a notch upon said plate cooperating with an operated tappet allowing a return movement of said plate to thereby break said circuit and lock said plate and carrier in place.

3. Apparatus according to claim 2 in which an arm unlocking the tappets is mounted a short distance behind said notch in said plate in the direction of rotation.

4. Apparatus according to claim 2 in which the motor is controlled by a switch actuated by the lateral displacement of the plate when one of the tappets presses upon it.

5. Apparatus according to claim 2 in which the plate is permanently coupled with a toothed wheel which meshes with the motor mechanism when the plate is displaced laterally by the action of a tappet.

LUCIEN GANDRIAUT.